(12) United States Patent
Shumilov et al.

(10) Patent No.: US 8,459,127 B2
(45) Date of Patent: Jun. 11, 2013

(54) FLOWMETER BODY WITH A GROOVE IN A FLOWMETER OUTLET SURFACE

(75) Inventors: Maxim Vladimirovich Shumilov, Chelyabinsk (RU); Damir Shamilevich Zaynulin, Chelyabinsk (RU)

(73) Assignee: Rosemount Inc., Chanhassen, MN (US)

(*) Notice: Subject to any disclaimer, the term of this patent is extended or adjusted under 35 U.S.C. 154(b) by 206 days.

(21) Appl. No.: 12/531,188

(22) PCT Filed: Oct. 29, 2008

(86) PCT No.: PCT/RU2008/000676
§ 371 (c)(1),
(2), (4) Date: May 23, 2011

(87) PCT Pub. No.: WO2010/050838
PCT Pub. Date: May 6, 2010

(65) Prior Publication Data
US 2011/0219885 A1    Sep. 15, 2011

(51) Int. Cl.
*G01F 1/32*  (2006.01)
(52) U.S. Cl.
USPC ...................................................... 73/861.24
(58) Field of Classification Search
USPC ......................................... 73/861.24, 861.22
See application file for complete search history.

(56) References Cited

U.S. PATENT DOCUMENTS

| | | | |
|---|---|---|---|
| 4,088,020 A | 5/1978 | Sgourakes et al. | 73/194 |
| 4,220,046 A | 9/1980 | Sqourakes | 73/861.23 |
| 4,220,146 A | 9/1980 | Cloutier | 73/861.22 |
| 4,699,012 A * | 10/1987 | Lew et al. | 73/861.24 |
| 4,703,659 A * | 11/1987 | Lew et al. | 73/861.24 |
| 4,926,695 A * | 5/1990 | Kleven et al. | 73/861.24 |
| 6,058,785 A | 5/2000 | Kalinoski et al. | 73/861.24 |
| 6,234,015 B1 | 5/2001 | Hamada et al. | 73/202.5 |
| 6,257,071 B1 * | 7/2001 | Dessert et al. | 73/861.22 |
| 7,082,840 B2 | 8/2006 | Bengtson | 73/861.22 |
| 7,882,751 B2 | 2/2011 | Hoecker | 73/861.22 |
| 8,234,931 B2 * | 8/2012 | Cheng et al. | 73/861.24 |
| 2002/0043103 A1 | 4/2002 | Uramachi et al. | 73/202.5 |
| 2004/0173030 A1 | 9/2004 | Harman | 73/861.65 |
| 2008/0072688 A1 | 3/2008 | Hoecker | 73/861.64 |

FOREIGN PATENT DOCUMENTS

WO    WO 2009/083533    7/2009

OTHER PUBLICATIONS

Communication pursuant to Rules 161(1) and 162 EPC for the European patent application No. 08876265.3 dated Jun. 14, 2011.
Metran-305PR Vortex Flowmeter Product Information Sheet.
First Office Action from the corresponding Chinese patent application No. 2008801317488 dated Mar. 7, 2012.
Examination Report for the corresponding European patent application No. 08876265.3 dated Apr. 20, 2012.

* cited by examiner

*Primary Examiner* — Jewel V Thompson
(74) *Attorney, Agent, or Firm* — Christopher R. Christenson; Westman, Champlin & Kelly, P.A.

(57) ABSTRACT

A flowmeter body (100) comprises a flow inlet (102), a flow passage (104) and a flow passage outlet (106). A shedder bar (108) is disposed in the flow passage (104). A sensor (110) couples to the flow passage. The sensor senses flow vortices (148) shed from the shedder bar. A flowmeter outlet surface (114) is joined to the flow passage outlet (106) and extends to an outer rim (116). The flowmeter outlet surface (114) includes an annular groove (118) positioned to interact with local vortices (120, 122) shed from the flow passage outlet.

17 Claims, 5 Drawing Sheets

FLOWMETER BODY WITH A GROOVE IN A FLOWMETER OUTLET SURFACE

CROSS-REFERENCE TO RELATED APPLICATION

This application is a Section 371 National Stage Application of International Application No. PCT/RU2008/000676, filed Oct. 29, 2008 and published as WO 2010/050838.

BACKGROUND OF THE INVENTION

Vortex flowmeters are used in the industrial process control field for measuring a flow rate of a fluid. Vortex flowmeters are typically inserted in a flow pipe or conduit that carries the fluid to be measured. Industry applications include petroleum, chemical, pulp and paper, mining and materials, oil and gas. The operating principal of a vortex flowmeter is based on a phenomenon of vortex shedding known as the von Karman effect. As fluid passes a bluff body, it separates and generates small eddies or vortices that are shed alternately along and behind each side of the bluff body. These vortices cause areas of fluctuating flow and pressure that are detected by a sensor. The frequency of vortex generation is essentially proportional to fluid velocity.

Fluid flow past non-uniformities that are downstream from the sensor can generate flow noise that couples back to the sensor. The flow noise reduces the accuracy of the flow measurement and presents a problem that limits performance of the flowmeter.

SUMMARY

Disclosed is a flowmeter body. The flowmeter body comprises a flow inlet and a flow passage that is joined to the flow inlet. The flowmeter body comprises a flow passage outlet. The flow passage extends to the flow passage outlet.

The flowmeter body comprises a shedder bar. The shedder bar is disposed in the flow passage. The flowmeter body comprises a sensor. The sensor couples to the flow passage. The sensor senses flow vortices that are shed from the shedder bar.

The flowmeter body comprises a flowmeter outlet surface. The flowmeter outlet surface is joined to the flow passage outlet. The flowmeter outlet surface extends to an outer rim of the flowmeter outlet surface. The flowmeter outlet surface includes an annular groove. The annular groove is positioned to interact with local vortices shed from the flow passage outlet.

Other features and benefits will be apparent upon reading the following detailed description and review of the associated drawings.

DETAILED DESCRIPTION

In the embodiments described below, a flowmeter body includes a flow inlet, a flow passage, and a flow passage outlet. A shedder bar is disposed in the flow passage and sheds flow vortices. The flowmeter body comprises a sensor that senses the flow vortices. A frequency of the vortices is representative of fluid flow rate through the flow passage. When the flowmeter body is installed in a pipeline that has an inside diameter that is much larger than an inside diameter of the flow passage, there is a large non-uniformity downstream of the shedder bar, and a potential for large flow noise.

The flowmeter body includes a flowmeter outlet surface that faces in a downstream direction and that is adjacent to the flow passage outlet. The flowmeter outlet surface extends to an outer rim of the flowmeter outlet surface. Undesired local vortices are shed as fluid flows from the flow passage outlet into a larger diameter downstream pipe flange. The flowmeter outlet surface is provided with an annular groove. The annular groove is positioned to interact with the undesired local vortices that are shed from the discontinuity at the flow passage outlet. Backflow of the undesired local vortices to the sensor is reduced by the annular groove. Coupling of flow noise to the sensor is reduced. The accuracy of flow measurement is increased by the use of the annular groove. Various aspects of a flowmeter body are described below in more detail in connection with FIGS. 1-7.

Figure 1:
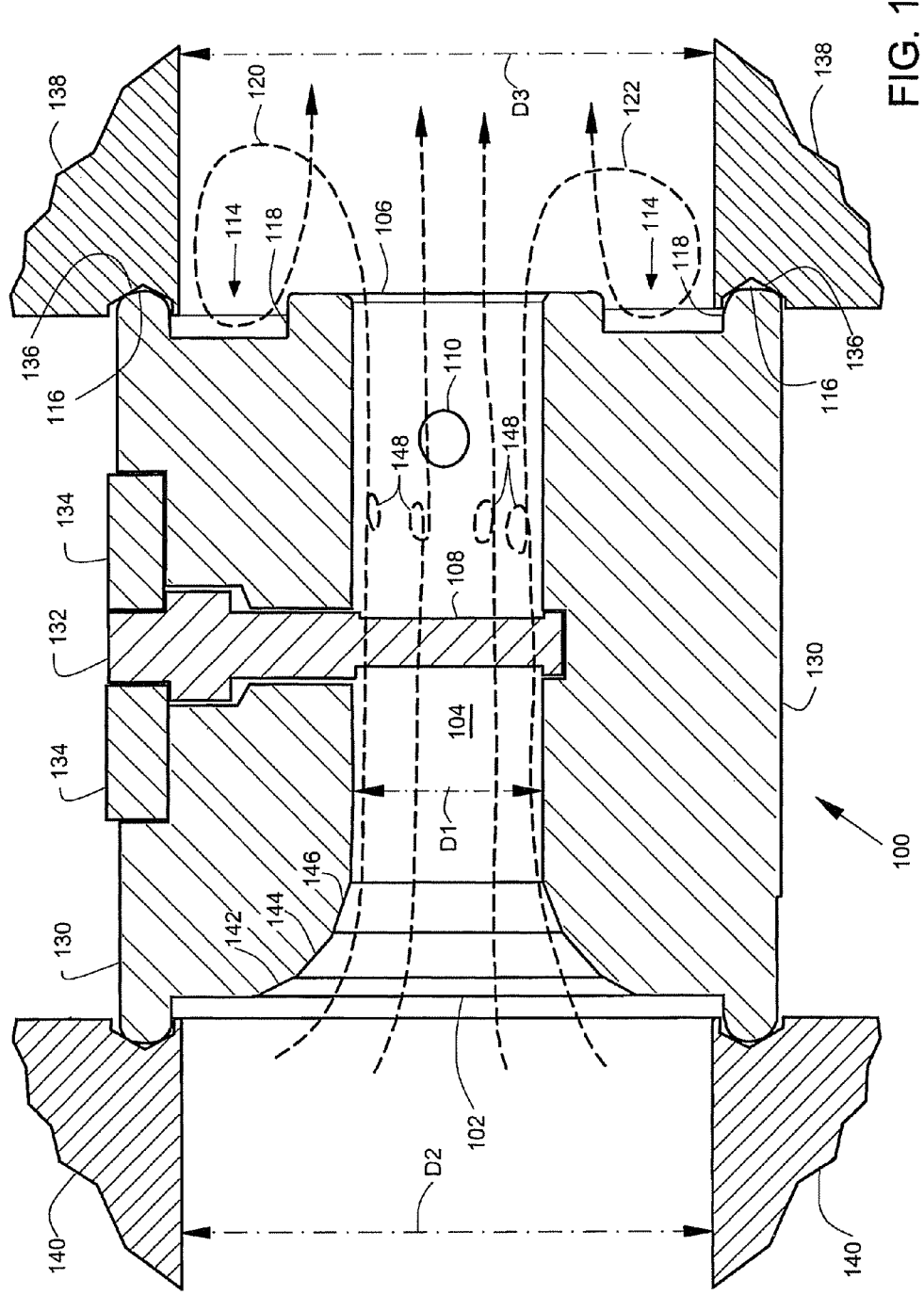
FIG. 1 illustrates a first cross sectional view of a flowmeter body.
Figure 2:
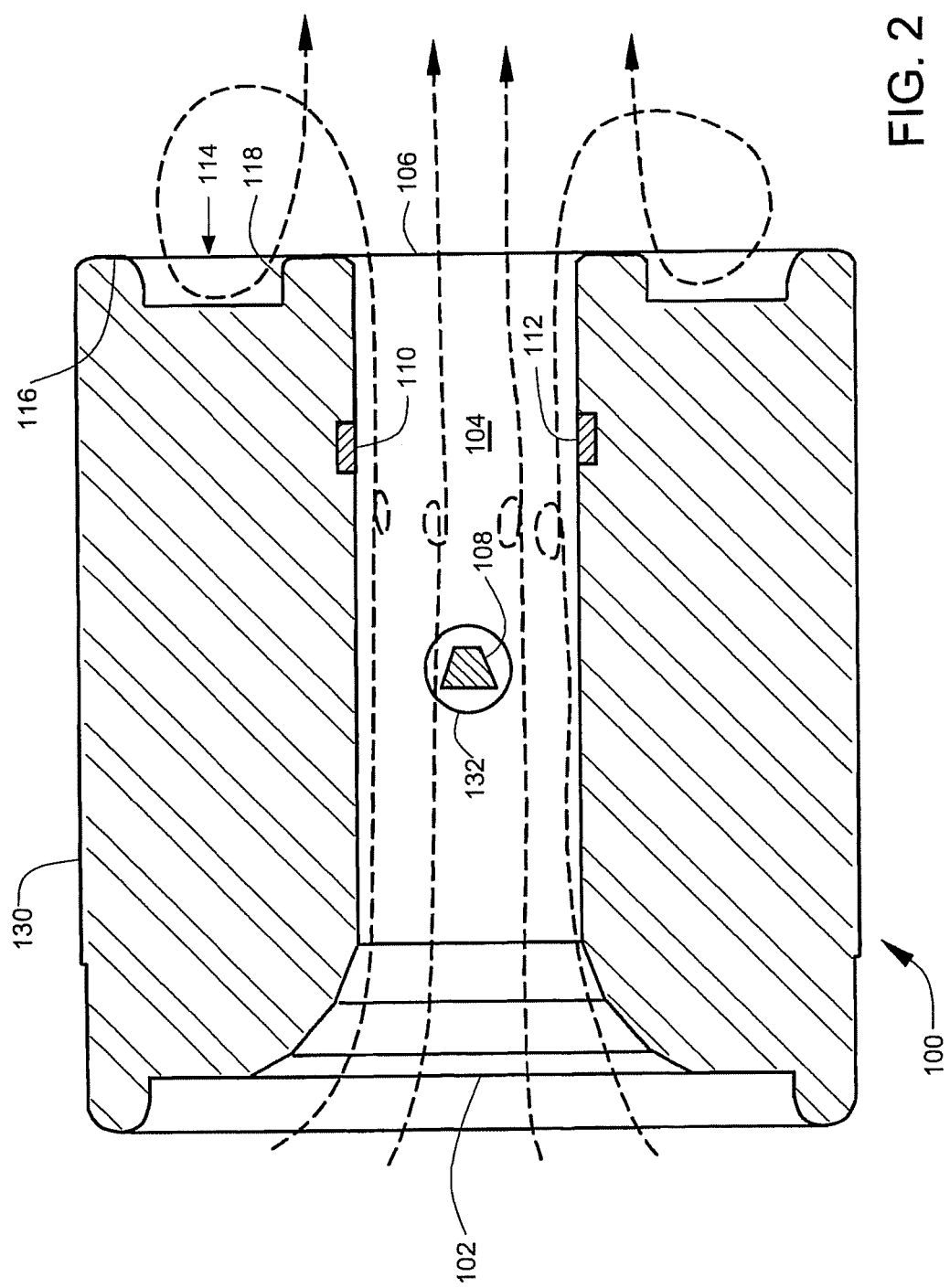
FIG. 2 illustrates a second cross sectional view of the flowmeter body of FIG. 1 that is transverse to the first cross sectional view in FIG. 1.

FIGS. 1-2 illustrate a flowmeter body 100. FIG. 1 illustrates a first cross sectional view, and FIG. 2 illustrates a second cross sectional view transverse to the first cross sectional view. The flowmeter body 100 comprises a flow inlet 102. The flowmeter body 100 comprises a flow passage 104 that is joined to the flow inlet 102. The flow passage 104 has a diameter D1 and extends to a flow passage outlet 106.

The flowmeter body 100 comprises a shedder bar 108. The shedder bar 108 is disposed in the flow passage 104. The flowmeter body comprises sensors 110, 112. The sensors 110, 112 couple to the flow passage 104. Fluid flows through the flow passage 104 past the shedder bar 108. As fluid flows past the shedder bar 108, a street of vortices 148 are formed in the fluid. The vortices flow downstream past the sensors 110, 112. The sensors 110, 112 sense the vortices 148 shed from the shedder bar 108. The sensed frequency of the vortices 148 is representative of fluid velocity through the flow passage.

According to one aspect, the sensors 110, 112 comprise pressure sensors. According to another aspect, the sensors 110, 112 comprise ultrasonic sensors. According to yet another aspect, the sensors 110, 112 include isolation diaphragms (isolation membranes) that separate electrical sensor components of the sensors 110, 112 from fluid flowing though the flow passage 104. According to yet another alternative aspect, the sensors 110, 112 are positioned on the shedder bar 108.

The flowmeter body 100 comprises a flowmeter outlet surface 114 that is joined to the flow passage outlet 106 and that extends to an outer rim 116 of the flowmeter outlet surface 114. An abrupt transition (discontinuity) in flow channel size from the smaller diameter D1 to a larger diameter D3 occurs at the flowmeter outlet surface 114. The abrupt transition at the flowmeter outlet surface 114 generates undesired local vortices 120, 122. The flowmeter outlet surface 114 includes an annular groove 118. The annular groove 118 is positioned to interact with undesired local vortices 120, 122 that are shed from the flow passage outlet 106. The annular groove 118 faces downstream. The annular groove 118 provides a fluid space that the local vortices 120, 122 can flow through without being disturbed. The use of the annular groove 118 avoids disturbing the flow of the local vortices 120, 122. The use of the annular groove 118 reduces flow noise due to a disturbed flow that is sensed at sensors 110, 112. The accuracy of the sensors 110, 112 is increased because there is less noise from the undesired local vortices 120, 122.

According to one aspect, the flowmeter body 100 comprises a shaped tube portion 130, a shedder bar portion 132, and a shedder bar retention plate portion 134. According to another aspect, the shaped tube portion 130, the shedder bar portion 132 and the retention plate 134 are formed of metal.

The outer rim 116 protrudes from the flowmeter body 100 and couples to a mating groove 136 of an outlet pipe flange 138. The outlet pipe flange 138 is downstream from the flowmeter body 100. The flowmeter body 100 is pressed against the outlet pipe flange 138 to form a fluid seal at the outer rim 116. An inner lip of the outlet pipe protrudes slightly into the annular groove 118. According to one aspect, the diameter D1 of the flow passage 104 is less than half of the inside diameter D3 of the outlet pipe flange 138 and of the outer rim 116. The large D3/D1 ratio provides an increase of flow velocity in the flow passage 104 and permits the flowmeter body 100 to be small enough to fit inside a mounting bolt circle.

Figure 7:
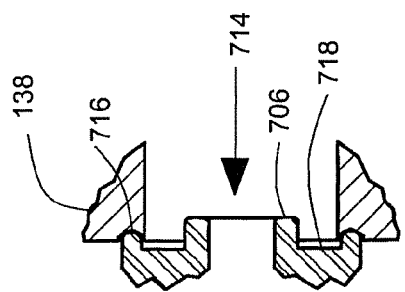
FIG. 7 illustrates an alternative embodiment of a flowmeter outlet surface that includes a flow passage outlet that protrudes relative to an outer rim of the flowmeter outlet surface.
Figure 6:
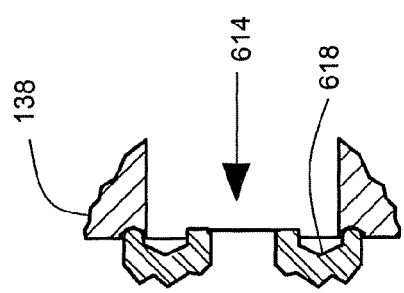
FIG. 6 illustrates an alternative embodiment of a flowmeter outlet surface that has an annular groove with a V-shaped cross section.
Figure 5:
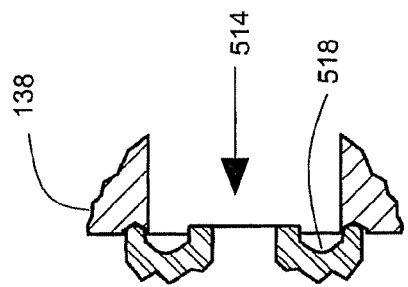
FIG. 5 illustrates an alternative embodiment of a flowmeter outlet surface that has an annular groove with a rounded cross section.

The annular groove 118 can have a rectangular cross section as illustrated in FIGS. 1-2. Alternatively, the annular groove 118 can have other cross sections as illustrated in FIGS. 5-7. According to one aspect, an interaction between the annular groove 114 and the local vortices 120, 122 reduces backflow of undesired local vortices 120, 122 through the flow passage 104. According to another aspect, the reduction of backflow reduces noise sensed by the sensors 110, 112.

The flow inlet 102 comprises a convergent flow inlet. The convergent flow inlet extends from a larger inlet diameter D2 of an upstream inlet pipe flange 140 to the smaller inlet diameter D1 of the flow passage 104. According to one aspect, the flow inlet 102 comprises a plurality of discrete conical converging surfaces 142, 144, 146 that are arranged stepwise. According to one aspect, the convergent flow inlet 102 increases the stability of flow vortices 148 shed by the shedder bar 108. According to another aspect, the ratio (D2/D1) is larger than one, which increases flow velocity through the flow passage 104, increases pressure near the shedding bar 108, reduces a potential for cavitation in liquids around the shedding bar 108 and improves accuracy of flow measurement.

Figure 3:
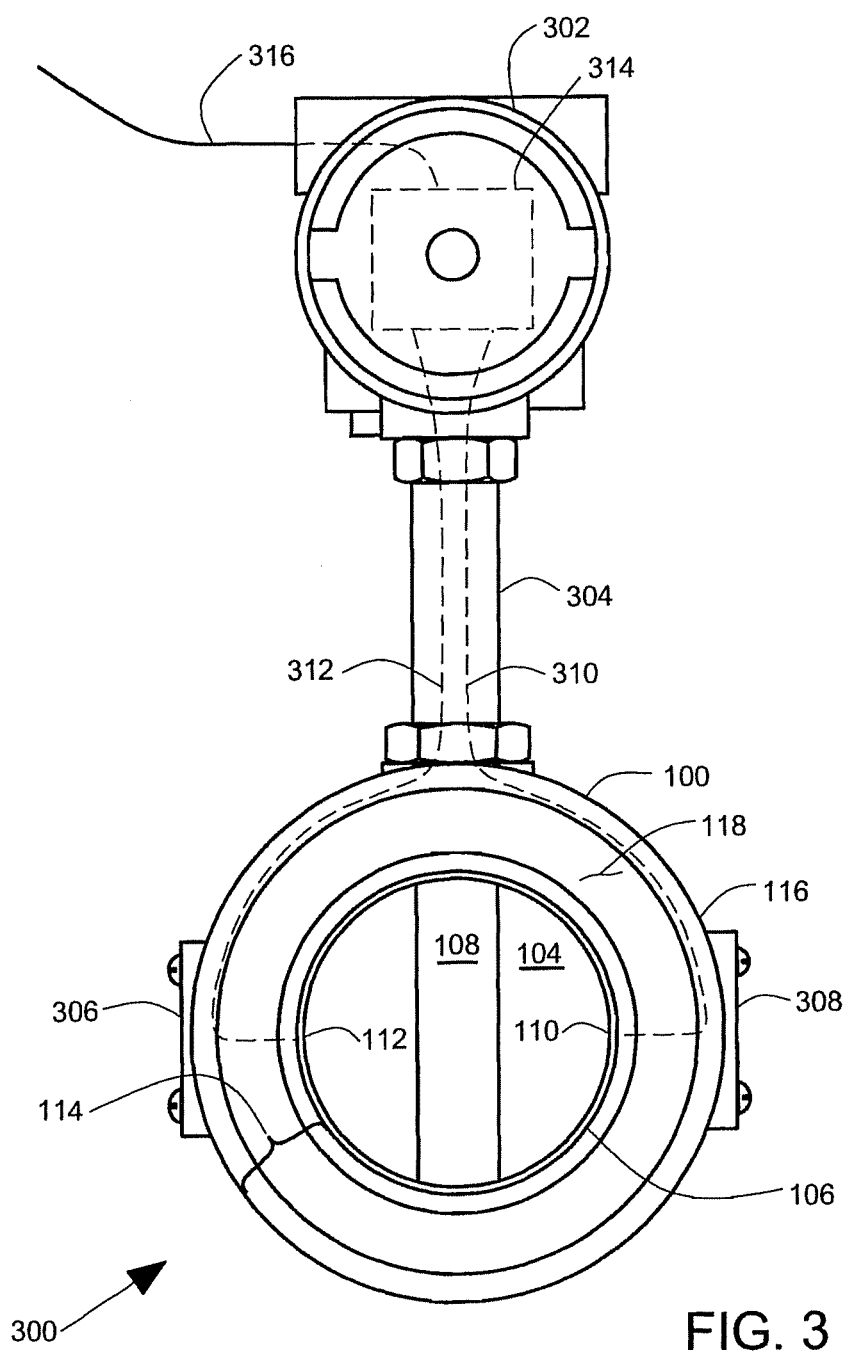
FIG. 3 illustrates a flowmeter body assembled with additional components to form a flow transmitter.

FIG. 3 illustrates the flowmeter body 100 assembled with additional components to form a flow transmitter 300. An electronics housing 302 is supported on the flowmeter body 100 by a mounting tube 304. Electrical leads 310, 312 from an electronic circuit 314 pass through the mounting tube 304 and wiring compartments 306, 308 to connect to the sensors 110, 112. The electronic circuit 314 converts frequency data from the sensors 110, 112 to a useful electrical output 316 that represents a rate of flow through the flowmeter body 100.

Figure 4:
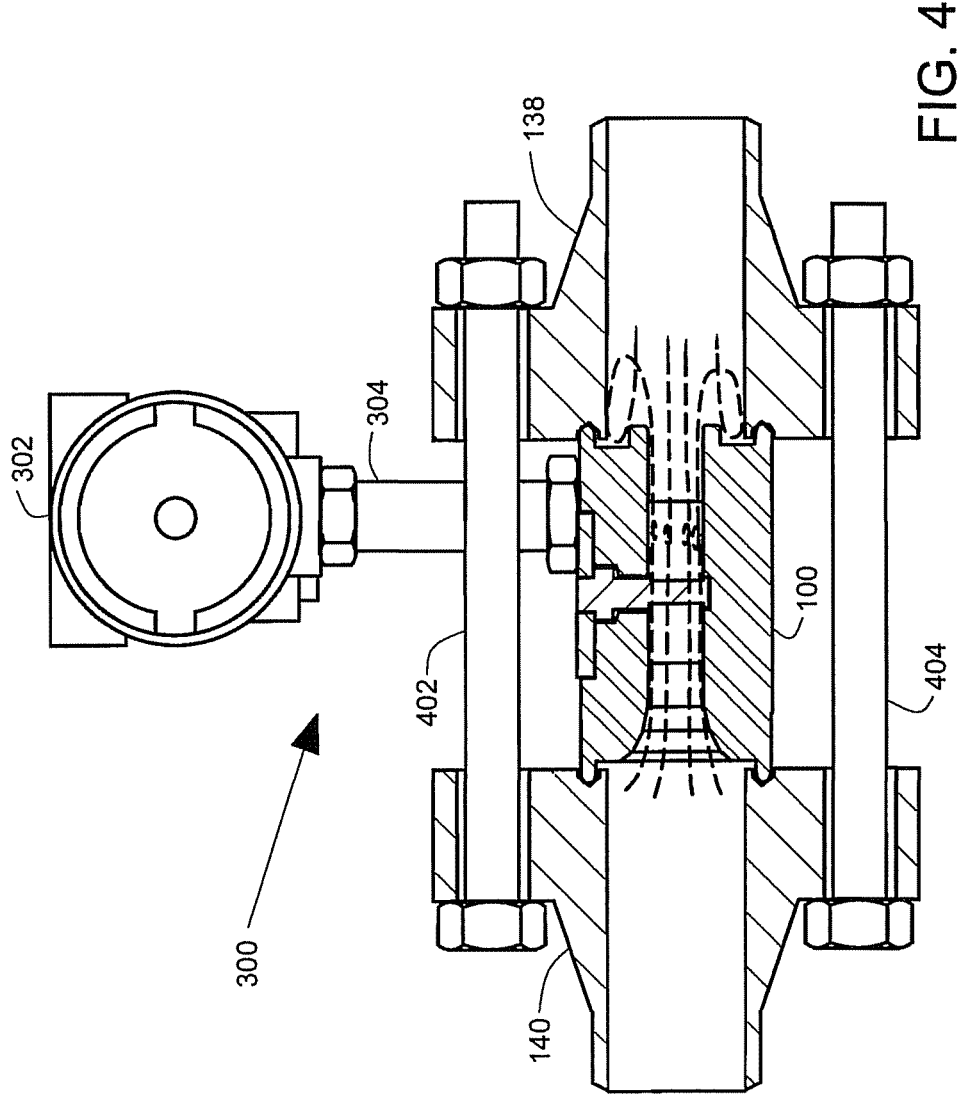
FIG. 4 illustrates a flow transmitter installed between an inlet pipe flange and outlet pipe flange using bolts.

FIG. 4 illustrates the flow transmitter 300 installed between inlet pipe flange 140 and outlet pipe flange 138. Multiple threaded bolts, such as bolts 402, 404 are tightened and exert a compressive sealing force on the flowmeter body 100. The flowmeter body 100 is caged inside a circle defined by the multiple threaded bolts, and will not fall out when the threaded bolts are loosened and the pipe flanges 138, 140 are spread apart slightly.

FIG. 5 illustrates an alternative embodiment of a flowmeter outlet surface 514 that mates with an outlet pipe flange 138 and that includes an annular groove 518. The annular groove 518 has a rounded cross section as illustrated.

FIG. 6 illustrates an alternative embodiment of a flowmeter outlet surface 614 that mates with an outlet pipe flange 138 and that includes an annular groove 618. The annular groove 618 has a V-shaped cross section as illustrated.

FIG. 7 illustrates an alternative embodiment of a flowmeter outlet surface 714 that mates with an outlet pipe flange 138 and that includes an annular groove 718. The flowmeter outlet surface 714 joins to a flow passage outlet 706 that protrudes relative to an outer rim 716. The protrusion of the flow passage outlet 706 forms an effectively deeper groove for reducing disturbance of the undesired local vortices and for reducing backflow.

Although the present invention has been described with reference to preferred embodiments, workers skilled in the art will recognize that changes may be made in form and detail without departing from the spirit and scope of the invention.

What is claimed is:

1. A flowmeter body, comprising:
   a flow inlet;
   a flow passage that is joined to the flow inlet and that extends to a flow passage outlet;
   a shedder bar disposed in the flow passage;
   a sensor coupled to the flow passage that senses flow vortices shed from the shedder bar; and
   a flowmeter outlet surface that is joined to the flow passage outlet and that extends to an outer rim of the flowmeter outlet surface, the flowmeter outlet surface including an annular groove that is positioned to interact with local vortices shed from the flow passage outlet.

2. The flowmeter body of claim 1 wherein the annular groove faces downstream.

3. The flowmeter body of claim 1 wherein the outer rim of the flowmeter outlet surface is couplable to an outlet pipe and the flow passage has a diameter that is less than half of a diameter of the outer rim.

4. The flowmeter body of claim 1 wherein the annular groove has a rectangular cross section.

5. The flowmeter body of claim 1 wherein the annular groove includes a rounded surface.

6. The flowmeter body of claim 1 wherein the annular groove includes a V-shaped surface.

7. The flowmeter body of claim 1 wherein the flow passage outlet protrudes beyond the outer rim of the flowmeter outlet surface.

8. The flowmeter body of claim 1 wherein the flow inlet comprises a plurality of discrete conical converging surfaces that are arranged stepwise.

9. A flow transmitter, comprising:
   a flow passage that extends to a flow passage outlet;
   a shedder bar disposed in the flow passage;
   a sensor coupled to the flow passage that senses flow vortices shed from the shedder bar;
   a flowmeter outlet surface that is joined to the flow passage outlet and that extends to an outer rim of the flowmeter outlet surface, the flowmeter outlet surface including an annular groove that is positioned to interact with local vortices shed from the flow passage outlet; and
   an electronic circuit coupled to the sensor, the electronic circuit generating an electrical output representative of a rate of flow through the flow passage.

10. The flow transmitter of claim 9 wherein the annular groove faces downstream.

11. The flow transmitter of claim 9 wherein the outer rim of the flowmeter outlet surface is couplable to an outlet pipe and the flow passage has a diameter that is less than half of a diameter of an outlet pipe.

12. The flow transmitter of claim 9 wherein the flow passage outlet protrudes beyond the outer rim of the flowmeter outlet surface.

13. The flow transmitter of claim 9 further comprising:
a flow inlet that comprises a plurality of discrete conical converging surfaces.

14. A method of measuring flow, comprising:
providing a flow passage that extends from a flow inlet to a flow passage outlet;
providing a shedder bar in the flow passage;
sensing flow vortices shed from the shedder bar with a sensor;
providing a flowmeter outlet surface that is joined to the flow passage outlet and that extends to an outer rim of the flowmeter outlet surface; and
positioning an annular groove in the flowmeter outlet surface to interact with local vortices shed from the flow passage outlet.

15. The method of claim 14 further comprising:
shaping the outer rim of the flowmeter outlet surface to seal to an outlet pipe, and
providing the flow passage with a diameter that is less than half of a diameter of the outer rim.

16. The method of claim 14 further comprising:
extending the flow passage outlet to protrude beyond the outer rim of the flowmeter outlet surface.

17. The method of claim 14 further comprising:
shaping the flow inlet to comprise a plurality of discrete conical converging surfaces that are arranged stepwise.

* * * * *

UNITED STATES PATENT AND TRADEMARK OFFICE
CERTIFICATE OF CORRECTION

PATENT NO. : 8,459,127 B2
APPLICATION NO. : 12/531188
DATED : June 11, 2013
INVENTOR(S) : Shumilov et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 230 days.

Signed and Sealed this
Eighth Day of September, 2015

Michelle K. Lee
*Director of the United States Patent and Trademark Office*